US006787760B2

(12) United States Patent
Belov et al.

(10) Patent No.: US 6,787,760 B2
(45) Date of Patent: Sep. 7, 2004

(54) METHOD FOR INCREASING THE DYNAMIC RANGE OF MASS SPECTROMETERS

(75) Inventors: Mikhail Belov, Richland, WA (US); Richard D. Smith, Richland, WA (US); Harold R. Udseth, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 36 days.

(21) Appl. No.: 09/976,505

(22) Filed: Oct. 12, 2001

(65) Prior Publication Data

US 2003/0071206 A1 Apr. 17, 2003

(51) Int. Cl.[7] .......................... H01J 49/00; B01D 59/44

(52) U.S. Cl. ....................................... 250/282; 250/292

(58) Field of Search ................................ 250/282, 288, 250/292

(56) References Cited

U.S. PATENT DOCUMENTS

| | | | | |
|---|---|---|---|---|
| 5,464,975 A | * 11/1995 | Kirchner et al. | ............ | 250/283 |
| 5,572,022 A | 11/1996 | Schwartz et al. | ........... | 250/282 |
| 6,107,623 A | * 8/2000 | Bateman et al. | ............ | 250/282 |
| 6,326,615 B1 | * 12/2001 | Syage et al. | ................ | 250/287 |

OTHER PUBLICATIONS

Belov, ME et al., "*Zeptomole–Sensitivity Electrospray Ionization—Fourier Transform Ion Cyclotron Resonance Mass Spectrometry of Proteins*", p. 2271–2279. 2000.

Belov, ME et al., "*Design and Performance of an ESI Interface for Selective External Ion Accumulation Coupled to a Fourier Transformation Ion Cyclotron Mass Spectrometer*", p. 253–261. 2001.

Belov, ME et al., "*Electrospray Ionization–Fourier Transform Ion Cyclotron Mass Spectrometry Using Ion Preselection and External Accumulation for Ultrahigh Sensitivity*", p. 38–48. 2001.

Bruce, JE et al., ""*Colored " Noise Waveforms and Quadrupole Excitation for the Dynamic Range Expansion of Fourier Transform Ion Cyclotron Resonance Mass Spectrometry*", p. 534–541. 1996.

Godovac–Zimmermann, J et al., "*Perspectives for Mass Spectrometry and Functional Proteomics*", p. 1–57. 2001.

Kofel, P et al., "*Time–of–Flight ICR Spectrometry*", p. 53–61. 1986.

(List continued on next page.)

*Primary Examiner*—John R. Lee
*Assistant Examiner*—Paul M. Gurzo
(74) *Attorney, Agent, or Firm*—Douglas E. McKinley, Jr.

(57) ABSTRACT

A method for enhancing the dynamic range of a mass spectrometer by first passing a sample of ions through the mass spectrometer having a quadrupole ion filter, whereupon the intensities of the mass spectrum of the sample are measured. From the mass spectrum, ions within this sample are then identified for subsequent ejection. As further sampling introduces more ions into the mass spectrometer, the appropriate rf voltages are applied to a quadrupole ion filter, thereby selectively ejecting the undesired ions previously identified. In this manner, the desired ions may be collected for longer periods of time in an ion trap, thus allowing better collection and subsequent analysis of the desired ions. The ion trap used for accumulation may be the same ion trap used for mass analysis, in which case the mass analysis is performed directly, or it may be an intermediate trap. In the case where collection is an intermediate trap, the desired ions are accumulated in the intermediate trap, and then transferred to a separate mass analyzer. The present invention finds particular utility where the mass analysis is performed in an ion trap mass spectrometer or a Fourier transform ion cyclotron resonance mass spectrometer.

11 Claims, 9 Drawing Sheets

OTHER PUBLICATIONS

Shen, Y et al., "*High–Throughput Proteomics Using High-Efficiency Multiple–Capillary Liquid Chromatography with On–Line High–Performance ESSI FTICR Mass Spectrometry*", p. 3011–3021. 2001.

Smith, RD et al., "*Evolution of ESI–Mass Spectrometry and Fourier Transformation Ion Cyclotron Resonance for Proteomics and Other Biological Applications*", p. 509–544. 2000.

* cited by examiner

| peptide | measured m/z, Da | calc. m/z, Da | error, ppm |
|---|---|---|---|
| $[Br+2H]^{2+}$ | 530.7905 | 530.7885 | 3.68 |
| $[Neuro+3H]^{3+}$ | 558.3106 | 558.311 | -0.75 |
| $[GrS+2H]^{2+}$ | 571.3609 | 571.3608 | 0.18 |
| $[AnI+2H]^{2+}$ | 648.8453 | 648.8465 | -1.86 |
| $[FibrA+2H]^{2+}$ | 768.8532 | 768.8504 | 3.62 |
| $[Neuro+2H]^{2+}$ | 836.9653 | 836.9626 | 3.15 |
| $[\gamma End+2H]^{2+}$ | 929.9652 | 929.9669 | -1.85 |
| $[y_9\ Neuro+2H]^{2+}$ | 578.8501 | 578.8518 | -2.80 |
| $[y_{10}\ Neuro+2H]^{2+}$ | 643.3715 | 643.3729 | -2.19 |
| $[y_{11}\ Neuro+2H]^{2+}$ | 724.9001 | 724.903 | -4.04 |

*average error: 2.41 ppm*

$f_{interpol}(Hz) = 7.009470x10^{13}x(1/m/z)^3+2.299154x10^{11}x(1/m/z)^2+3.614403x10^8x(1/m/z)+1.007772x10^5$

| peptide | $f_{exper}$(Hz), experiment | $f_{predict}$(Hz), predicted | Maximum resolution |
|---|---|---|---|
| $[Br+2H]^{2+}$ | 234500 | 232773.47 | 135 |
| $[Neuro+3H]^{3+}$ | 210500 | 211722.22 | 172 |
| $[GrS+2H]^{2+}$ | 202500 | 203511.93 | 200 |
| $[AnI+2H]^{2+}$ | 167500 | 166711.62 | 212 |
| $[SubP+2H]^{2+}$ | 158500 | 158145.75 | 447 |
| $[Neuro+2H]^{2+}$ | 122500 | 122390.09 | 1114 |
| $[Br+H]^{+}$ | 94000 | 94334.15 | 280 |
| $[GrS+H]^{+}$ | 85000 | 86457.77 | 58 |
| $[AngI+H]^{+}$ | 74500 | 73330.01 | 64 |

METHOD FOR INCREASING THE DYNAMIC RANGE OF MASS SPECTROMETERS

STATEMENT REGARDING GOVERNMENT RIGHTS

This invention was made with Government support under Contract DE-AC0676RLO1830 awarded by the U.S. Department of Energy. The Government has certain rights in the invention.

CROSS REFERENCE TO RELATED APPLICATIONS

Not Applicable

FIELD OF THE INVENTION

The present invention relates to methods for increasing the dynamic range of mass spectrometers. More specifically, the present invention is a method of improving the performance of mass spectrometers by first generating a mass spectrum, and then trapping and selectively ejecting ions using resonant rf excitation in a quadrupole ion filter based upon information from the prior spectrum.

BACKGROUND OF THE INVENTION

Progress in a wide range of scientific inquiry requires the qualitative and quantitative analysis of molecules, and important classes of problems involve the analysis of complex mixtures where the relative abundances of mixture components vary over many orders of magnitude. For example, a major goal of biological research in the field of proteomics is the understanding of protein functions in a cellular context. Unfortunately, many important protein classes necessary for this understanding are present only at low concentrations. As noted in Godovac-Zimmerman, J.; Brown, L. *Mass Spectrom. Rev.,* 2000, 20, 1–57, the range of peptide (or protein) concentrations of interest in proteomic measurements can vary more than six orders of magnitude and can include $>10^5$ components. When analyzed in conjunction with capillary LC separations, both the total ion production rate from ESI and the complexity of the mixture at any point can vary by more than two orders of magnitude, and the relative abundances of specific components of interest can vary by $>10^6$. This variation in ion production rate and spectral complexity constitutes a major challenge for proteome analyses. For example, the elution of highly abundant peptides can restrict the detection of lower-level co-eluting peptides since the dynamic range presently achieved in a single spectrum is $\sim10^3$ for a Fourier transform ion cyclotron resonance (FTICR) mass spectrometer and < or $\sim10^2$ for an ion trap mass spectrometer. If the ion accumulation process (i.e., ion accumulation time) is optimized for the most abundant peaks, the accumulation trap will not be filled to capacity during the elution of lower abundance components from a chromatographic or electrophoretic separation, and the overall experimental dynamic range will be significantly constrained. If, however, longer accumulation times are used, the conditions conventionally used result in an "overfilling" of the analyzer trap in many cases, which will be manifested by biased accumulation, loss of measurement accuracy, or extensive activation and dissociation of the analytes. Thus, there is a need for methods aimed at avoiding the undesired artifacts associated with overfilling the mass analyzer trap. There is a further need for approaches which will also simultaneously expand the dynamic range of measurements.

Those having skill in the art have proposed a variety of methods and techniques to expand this dynamic range. In one such approach, a quadrupole ion filter is used as some combination of high and low bandpass filters, i.e. a mass filter to select a specific species or mass range for detailed analysis. However, this approach is targeted at a specific m/z peak or limited mass range and results in the loss of possible information on other low abundance species, and this is not generally useful in the characterization of complex mixtures. Therefore, there exists a need for methods for enhancing the dynamic range of mass spectrometers that can address complex mixtures with components having abundances spanning many orders of magnitude.

SUMMARY OF THE INVENTION

Accordingly, the present invention is a method for increasing the dynamic range of mass spectrometers. More particularly, the present invention finds particular utility in increasing the dynamic range of mass spectrometers which utilize ion trap type mass analyzers, such as quadrupole ion trap mass spectrometers (ITMS) and Fourier transform ion cyclotron resonance (FTICR) mass spectrometers. By way of example, and not meant to be limiting, when analyzing complex protein digests, the present invention can increase the dynamic range of a mass spectrometer through the simultaneous and selective suppression of higher abundance peaks dispersed cross the mass spectrum. By eliminating these ions, lower abundant species can be analyzed since they can be accumulated to detectable levels, resulting in an increase in the dynamic range of the instrument.

As practiced by the present invention, selective ejection of the most abundant ion species from a quadrupole filter, is performed with rf excitation. Such excitation can be dipolar, quadrupolar, or parametric. If the frequency of the auxiliary rf-field is equal to the secular frequency (i.e., resonant excitation) or to the doubled secular frequency (i.e., parametric excitation) of a particular m/z ion species, the auxiliary rf-field causes these ions to oscillate with increased amplitudes. By introducing a supplemental rf-field, ions stored in a quadrupole ion filter can thus be efficiently ejected using either parametric excitation or resonant excitation.

The present invention thus increases the dynamic range of a mass spectrometer by utilizing a quadrupole ion filter as a device to selectively remove one or more undesired ions (peaks), thereby allowing the accumulation and subsequent detection of desired ions in a mass analyzer, such as an ion trap operated as a mass analyzer, adjunct to the ion filter. Typically, but not meant to be limiting, the desired ions are those that are present at relatively low concentrations, while the undesired ions are those that are present at relatively high concentrations. Accordingly, the present invention finds particular utility in instruments where ion capacity is constrained, such as mass spectrometers which utilize ion trapping in their analysis and detection schemes.

The method of the present invention first passes a sample of ions through the mass spectrometer having a quadrupole ion filter, whereupon the intensities of the mass spectrum of the sample are measured. From the mass spectrum, ions within this sample are then identified for subsequent ejection. Typically, the ions identified for subsequent ejection will be the most highly abundant species, as the ejection of these species produces the most additional "room" for further accumulation in the ion trap. However, it may not always be the case that ions are selected for ejection based purely on their abundance. In certain applications, ions are selected simply because they are not of interest to the desired analysis, even though they are not the most abundant. The present invention should thus be broadly construed to include any application where ions are selectively ejected using rf excitation to make room for further accumulation.

As further sampling introduces ions into the mass spectrometer, the appropriate rf voltages are applied to a quadrupole ion filter, thereby selectively ejecting the undesired ions previously identified. In this manner, the desired ions may be collected for longer periods of time in the mass analyzer, thus allowing better collection and subsequent analysis of the desired ions.

The mass analyzer used for accumulation may be the same ion trap used for mass analysis in a FTICR or ITMS, in which case the mass analysis is performed directly, or it may be an intermediate trap. In the case where collection is an intermediate trap, the desired ions are accumulated in the intermediate trap, and then transferred to a separate ion trap in a FTICR or ITMS, where the mass analysis is performed.

The method of the present invention may be further enhanced as follows. Those skilled in the operation of ion trapping mass spectrometers generally have an understanding of the optimal level of charge, or ions, that can be introduced into a given trap, without causing undesirable effects on ion identification. Accordingly, when practicing the method of the present invention with a given sample of some unknown, a skilled artisan, utilizing a computer controlled series of steps, would first determine the amount of time necessary to fill the ion trap within the instrument to some optimal level of ions. The proportion of the ions that were then identified for selective ejection (the undesired ions) would then be compared to the total mass spectrum. In that manner, the skilled artisan could accurately gauge the length of time necessary to fill the ion trap to its' optimal level with the desired ions, while ejecting undesired ions in the ion filter in the manner described above. As further introduction of ions proceeded, with the ejection of those undesired ions identified in the initial evaluation, the ion trap can be easily filled to the optimal level with only the desired ions, including many that likely were not detectable before this step.

If, by way of example, it were determined that 90% of the ions in a given sample were undesirable ions to be ejected, then ten times the initial amount of time needed to fill the ion trap would be allowed to pass while ejecting those undesirable ions. In this manner, the ion trap is filled to the optimal level with only desirable ions. Those having skill in the art will recognize that the precise amount of time necessary to fill the trap becomes a function of the optimal level to which the trap is filled, and the proportion of a given sample that is to be ejected according to the method of the present invention. Suitable adjustments for any particular circumstance can thus be made to optimize the instruments performance, and this type of control can readily be accomplished by the computer that acquires data during mass spectrum analysis.

As will be apparent to those having skill in the art, the method of the present invention can further be repeated as many times as desired to achieve ever greater dynamic range for the instrument. For example, several undesirable species may be identified and eliminated as described above. As noted above, those will typically be species that are highly abundant. However, "abundance" is a relative term. Once those ions that were highly abundant in the initial sampling are removed, a different set of ions will predominate, and new ions that were previously undetectable will appear. A portion of these ions may then further be identified as undesirable. In addition to the highly abundant species previously identified, a portion of these ions may also be eliminated in subsequent trapping and analysis, using the same technique of rf excitation at the appropriate level for each identified ion. In this manner, the dynamic range of the instrument can be expanded in a step-wise fashion to theoretically infinite levels.

The operation and use of the present invention is more fully illustrated in the description of the preferred embodiments and the experiments conducted to demonstrate the efficacy of the present invention that follow. However, the specific examples set forth in the description of the preferred embodiments and the experiments should in no way be construed as limiting the scope of the present invention in its broader aspects, and the present invention should be understood to encompass and include any and all variations and combinations of any specific equipment that might be utilized to accomplish the basic steps set forth in the summary of the invention provided herein.

DESCRIPTION OF THE PREFERRED EMBODIMENT(S)

Figure 1:
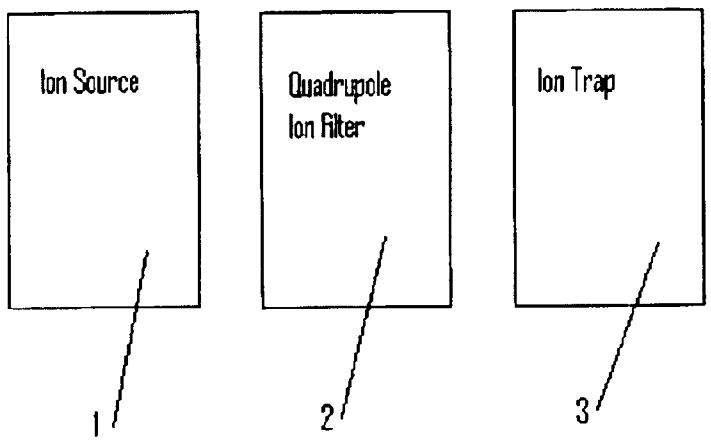
FIG. 1 is a diagram of the a series of ion traps utilized in a preferred embodiment of the present invention.
Figure 2:
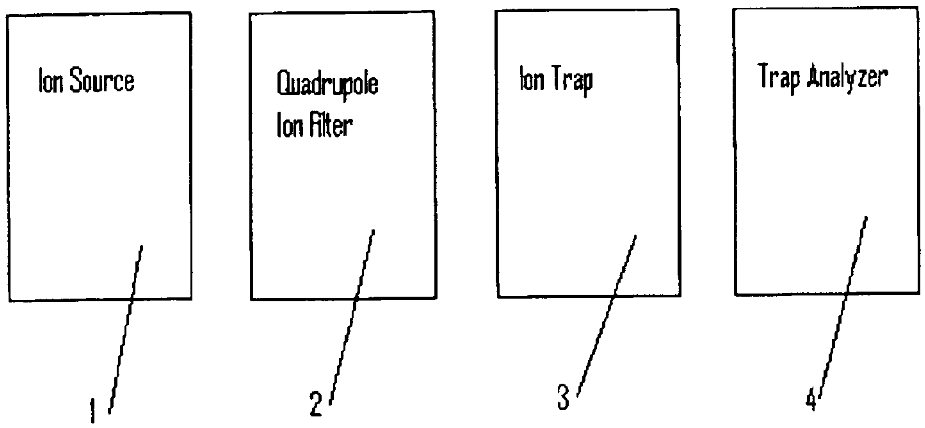
FIG. 2 is a schematic diagram of the operation of a quadrupole ion filter utilized in a preferred embodiment of the present invention.

A schematic representation of two preferred embodiments of the present invention are shown in FIGS. 1 and 2 respectively. As shown in FIG. 1, the present invention consists essentially of an ion source 1 in which ions are generated. The ion source may be any source conventionally used in mass spectrometry, such as an electrospray (ESI) ion source, and may be further interfaced with any of the conventional separation schemes (not shown), such as electrophoretic or chromatographic, commonly utilized in the art. Ions generated in the ion source 1 are then transferred to a quadrupole ion filter 2, and then to an ion trap 3. In this first preferred embodiment, in addition to accumulating the desired ions in the ion trap 3, the mass analysis is also performed in ion trap 3.

Ions are introduced through the ion source 1, the quadrupole ion filter 2, and the ion trap 3 whereupon a mass spectrum is performed. Undesired ions are then detected, and as further ions are introduced into the system, the appropriate rf fields are applied to the quadrupole ion filter 2 such that the undesired ions are ejected. Preferably, ejection is caused by resonant rf-only excitation. This resonant rf-only excitation may be dipolar, quadrupolar, or parametric. Once the undesired ions have been ejected, the desired ions are then accumulated in the ion trap 3 for subsequent analysis. The ion trap 3 is preferably an ion trap mass spectrometer or a Fourier transform ion cyclotron mass spectrometer.

In the second preferred embodiment of the present invention, ion source 1, the quadrupole ion filter 2, and the ion trap 3 are same as in the first preferred embodiment, except that the ion trap 3 is used merely for accumulation of the desired ions. Accordingly, an ion trap 4 is further provided for mass analysis. In both of the preferred embodiments, the ejection of undesired ions occurs in the quadrupole ion filter 2. The trap analyzer 4 is again, preferably an ion trap mass spectrometer or a Fourier transform ion cyclotron mass spectrometer.

A series of experiments utilizing this preferred embodiment of the present invention were conducted to demonstrate the enhanced dynamic range of an Fourier transform ion cyclotron (FTICR) mass spectrometer enabled by the present invention. As with the description of the preferred embodiments provided above, these experiments are merely illustrative and should in no way be interpreted as limiting the scope of the present invention. Accordingly, any and all modifications of the experiments such as the analysis of samples differing from those described herein, or the use equipment differing from the precise equipment described in this illustrative example, falling within spirit and scope of the claims at the concluding portion of this specification should be considered as falling within the scope of the present invention.

The FTICR mass spectrometer used in these studies was a 3.5 tesla unshielded solenoid magnet (Oxford Instruments, UK) utilizing a vacuum system design described in Belov, M. E.; Nikolaev, E. N.; Anderson, G. A.; Udseth, H. R.; Conrads, T. P.; Veenstra, T. D.; Masselon, C. D.; Gorshkov, M. V.; Smith, R. D. *Anal. Chem.,* 2001, 73, 253–261. The mass spectrometer incorporated an ESI ion source with an electrodynamic ion funnel described in Belov, M. E.; Gorshkov, M. V.; Anderson, G. A.; Udseth, H. R.; Smith, R. D. *Anal. Chem.,* 2000, 72, 2271–2279, a quadrupole for collisional focusing, an external accumulation interface described in Belov, M. E.; Nikolaev, E. N.; Anderson, G. A.; Udseth, H. R.; Conrads, T. P.; Veenstra, T. D.; Masselon, C. D.; Gorshkov, M. V.; Smith, R. D. *Anal. Chem.,* 2001, 73, 253–261 and Belov, M. E.; Nikolaev, E. N.; Anderson, G. A.; Auberry, K. J.; Harkewicz, R.; Smith R. D. *J. Am. Soc. Mass Spectrom.,* 2001, 12, 38–48, an electrostatic ion guide and an FTICR cylindrical dual cell combination. An Odyssey data station (Finnigan Corp., Madison, Wis.) controlled the timing and potential distribution during the experiments. To implement data-dependent selective external ion ejection, a 12-bit ADC (National Instruments, Austin, Tex.) coupled to a Pentium PC running ICR-2LS software, available from the Pacific Northwest National Laboratory, owned by the United States Department of Energy and managed by the Battelle Memorial Institute, was utilized for parallel data acquisition.

Figure 3:
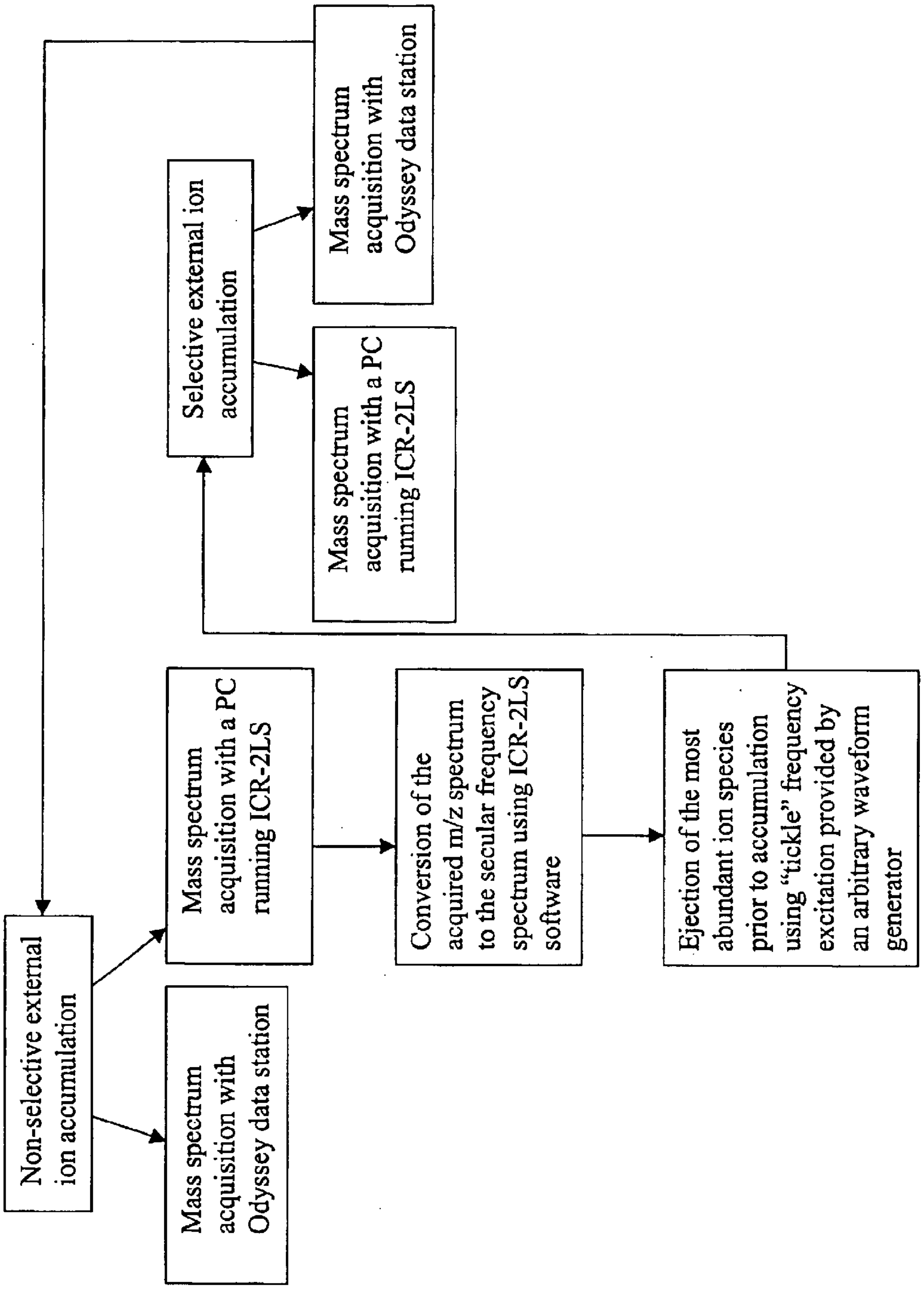
FIG. 3 is a box diagram showing the steps used in a series of experiments performed to demonstrate the present invention. As shown in the diagram, non-selective ion trapping in the accumulation quadrupole occurs for a short period. Signal acquisition is performed using both an Odyssey data station and a 12-bit ADC coupled to a PC running ICR-2LS software available at the Pacific Northwest National Laboratory. Mass spectra acquired with the PC are converted to secular frequency spectra of ion oscillation in the selection quadrupole and a superposition of the sine auxiliary rf waveforms is applied to the selection quadrupole rods. Selective ion trapping in the accumulation quadrupole occurs for a period longer than that used in the non-selective accumulation. During the selective accumulation the most abundant ion species determined from the previous spectrum are ejected from the selection quadrupole prior to external accumulation. The combined information from the two mass spectra provides information over a much wider dynamic range than would be afforded by either spectrum alone. Following ion transfer to the FTICR cell ions are then again non-selectively trapped in the accumulation quadrupole to maintain higher duty cycle, to repeat the sequence.

FIG. 3 shows the experimental steps used for data-dependent selective external ion ejection followed by FTICR detection. Two alternating sequences were employed for data acquisition. Ions generated by the ESI source were non-selectively trapped in the accumulation quadrupole. Following a short storage period the externally accumulated ions were ejected to the FTICR cell and captured using gated trapping, as described in Kofel, P; Allemann, M; Kellerhals, H; Wanczek, K. P. *Int. J. Mass Spectrom.,* 1986, 72, 53–61. During the storage period used for collisional damping the ion's kinetic energy in the accumulation quadrupole, the rf-potential on the collisional quadrupole rods was switched off so that no ions from the ESI could enter the accumulation region. During ion excitation in the FTICR cell, a trigger pulse was applied to the 12 bit ADC making it ready for data acquisition. Acquired mass spectra were converted to secular frequency spectra of ion oscillation in the selection quadrupole and a superposition of excitation sine waveforms at the frequencies corresponding to the secular frequencies of the most abundant ion species in the selection quadrupole was synthesized with the ICR-2LS software available at the Pacific Northwest National Laboratory. These excitation waveforms were generated by a 32K plug-in PC DAC board (National Instruments, Austin, Tex.) and then applied to the selection quadrupole rods as an auxiliary rf-field. Using this approach, one or several of the most abundant ion species were ejected from the selection quadrupole resulting in external ion accumulation of lower abundant species for extended periods. To maintain higher duty cycle, the auxiliary rf-field was switched off immediately following the ion transfer to the FTICR cell, thus allowing for the non-selective external ion trapping in the accumulation quadrupole while analyzing the lower abundant ion species in the FTICR cell.

Peptides purchased from Sigma (Sigma Chemicals, St. Louis, Mo.) and used without further purification were dissolved in a water:methanol:acetic acid solution (49:49:2 v %) at different concentrations ranging from 0.1 mg/mL to 2 pg/mL. The solutions were infused into the ESI source at a flow rate of 300 nL/min using a syringe pump (Harvard, South Natick, Mass.). HPLC/FTICR MS data sets were obtained using a Gilson model 321 pump and 235P auto injector both controlled via Unipoint System software (Gilson Inc., Middleton, Wis.). A reversed-phase capillary HPLC column was constructed by acetone slurry packing at 10,000 psi 3 $\mu$m Jupiter $C_{18}$ stationary phase (Phenomenex, Torrence, Calif.), 0.1 g/ml suspended in acetone, into a 85 cm, 360 $\mu$m o.d.×150 $\mu$m i.d., fused silica capillary (Polymicro Technologies Inc., Phoenix, Ariz.) incorporating a 2 $\mu$m retaining mesh in an HPLC union (Valco Instruments Co., Houston, Tex.). The mobile phase consisted of 0.1% formic acid in water (A) and 0.1% formic acid in 90% acetonitrile/10% water (B) and was degassed online using a vacuum degasser (Jones Chromatography Inc., Lakewood, Colo.). The HPLC pump flow, 300 $\mu$l/min, was split through a capillary micro tee assembly (Upchurch Scientific, Oak Harbor, Wash.) before the auto injector to establish a measured flow through the column of 1.5 $\mu$l/min. After a tryptic peptide volume of 10 $\mu$l, 1 $\mu$g/$\mu$l concentration was injected onto the reversed-phase capillary column, the mobile phase was held at 100% A for 10 minutes. Then the following linear gradients were applied; 20% B over 100 minutes, 30% B to 100% B over 60 minutes and then held at 100% B for 60 minutes. The column was then re-equilibrated with 100% A prior to the next injection.

Figure 4:
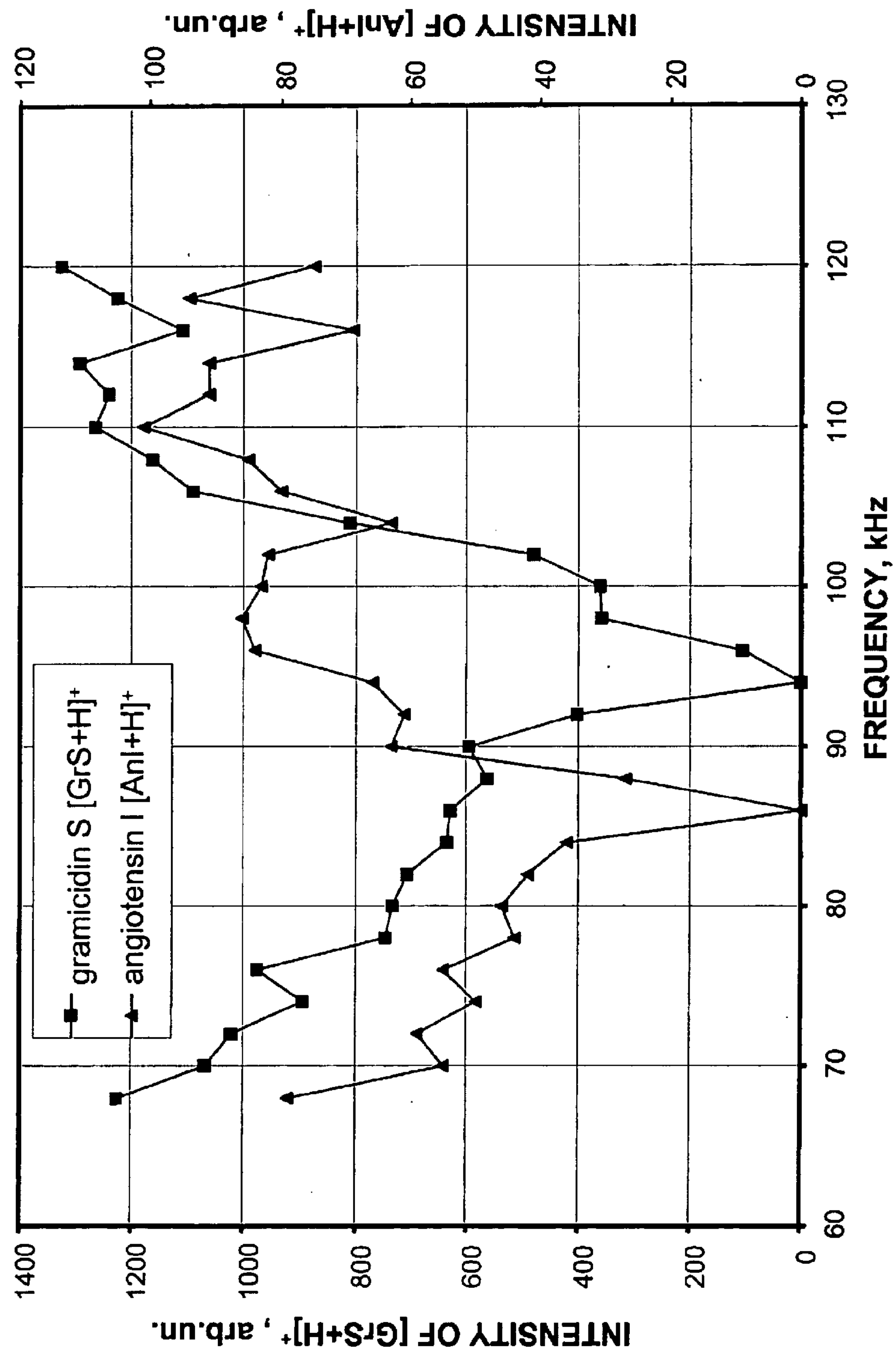
FIG. 4 is a graph of the signal intensities of the singly charged ions of gramicidin S ($[GrS+H]^+$) and angiotensin I ($[AnI+H]^+$) as functions of the dipolar excitation frequency. The ions were accumulated for 5 ms and then stored for 1000 ms in the selection quadrupole. The rf-potential on the collisional quadrupole rods was switched off during the storage period preventing ions from the ESI source from entering the selection quadrupole. Dipolar excitation at a peak-to-peak amplitude of 400 mV was continuously applied to a pair of rods of the selection quadrupole. The Mathieu parameter q was 0.45 for the singly charged bradykinin ions.

A key component of the present invention is ion ejection based on resonant dipolar, quadrupolar or parametric excitation. However, this technique can be affected by the space charge due to ions trapped in, or passing through, the selection quadrupole. A $10^{-6}$ M solution of a mixture of bradykinin, gramicidin S, and angiotensin I was used to evaluate the space charge effects in the selection quadrupole. FIG. 4. shows the dependence of the signal intensities of the singly charged ions of gramicidin S ($[GrS+H]^+$) and angiotensin I ($[AnI+H]^+$) on the dipolar excitation frequency. The ions were accumulated in the selection quadrupole for 5 ms. Ion accumulation was followed by a 1000 ms-long storage period (the rf-potential on the collision quadrupole rods was switched off) and a 600 $\mu$s-long ion ejection step to transfer ions to the FTICR cell. A 400 $mV_{p-p}$ supplementary rf-field was continuously applied to a pair of rods of the selection quadrupole for dipolar excitation and ejection of the trapped ion species. The singly charged ions of gramicidin S were resonantly ejected at a frequency of 95 kHz.

Figure 5:
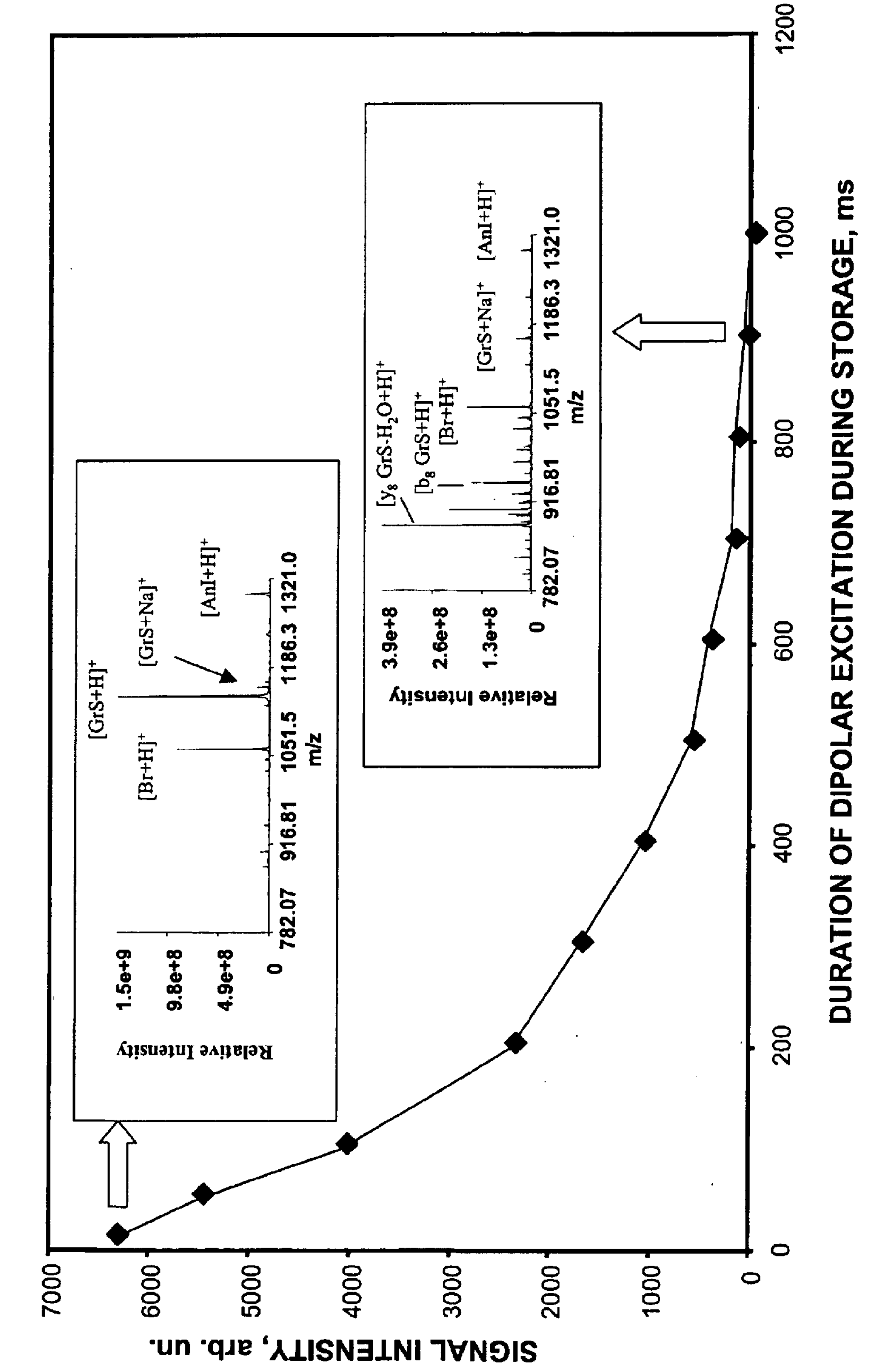
FIG. 5 is a graph of the signal intensity of the singly charged ions of gramicidin S ($[GrS+H]^+$) as a function of the duration of dipolar excitation. The 200 ms-long ion accumulation was followed by a 1000 ms-long storage period in the selection quadrupole. Dipolar excitation was applied at a resonant frequency of 80 kHz and a peak-to-peak amplitude of 750 mV. The insets represent the mass spectra acquired at the beginning and at the end of the storage period. The Mathieu parameter q was 0.42.

FIG. 5 shows the signal intensity of the singly charged ions of gramicidin S as a function of the duration of the resonant dipolar excitation. The ion accumulation time was increased to 200 ms followed by a 1000-ms long storage period. Dipolar rf-only excitation was applied to the selection quadrupole rods throughout the accumulation and storage periods. The mass spectra acquired at the beginning and at the end of the storage period are shown in the insets. Three important observations can be made related to the increased accumulation time. First, to eliminate the $[GrS+H]^+$ peak in a mass spectrum, the amplitude of dipolar excitation had to be increased to 750 $mV_{p-p}$ for the same storage period as in FIG. 4. Second, compared to FIG. 4, the resonance frequency for dipolar excitation of $[GrS+H]^+$ ions decreased to 80 kHz. Third, resonant excitation of $[GrS+H]^+$ species was found to be accompanied by their pronounced fragmentation.

Figure 6:
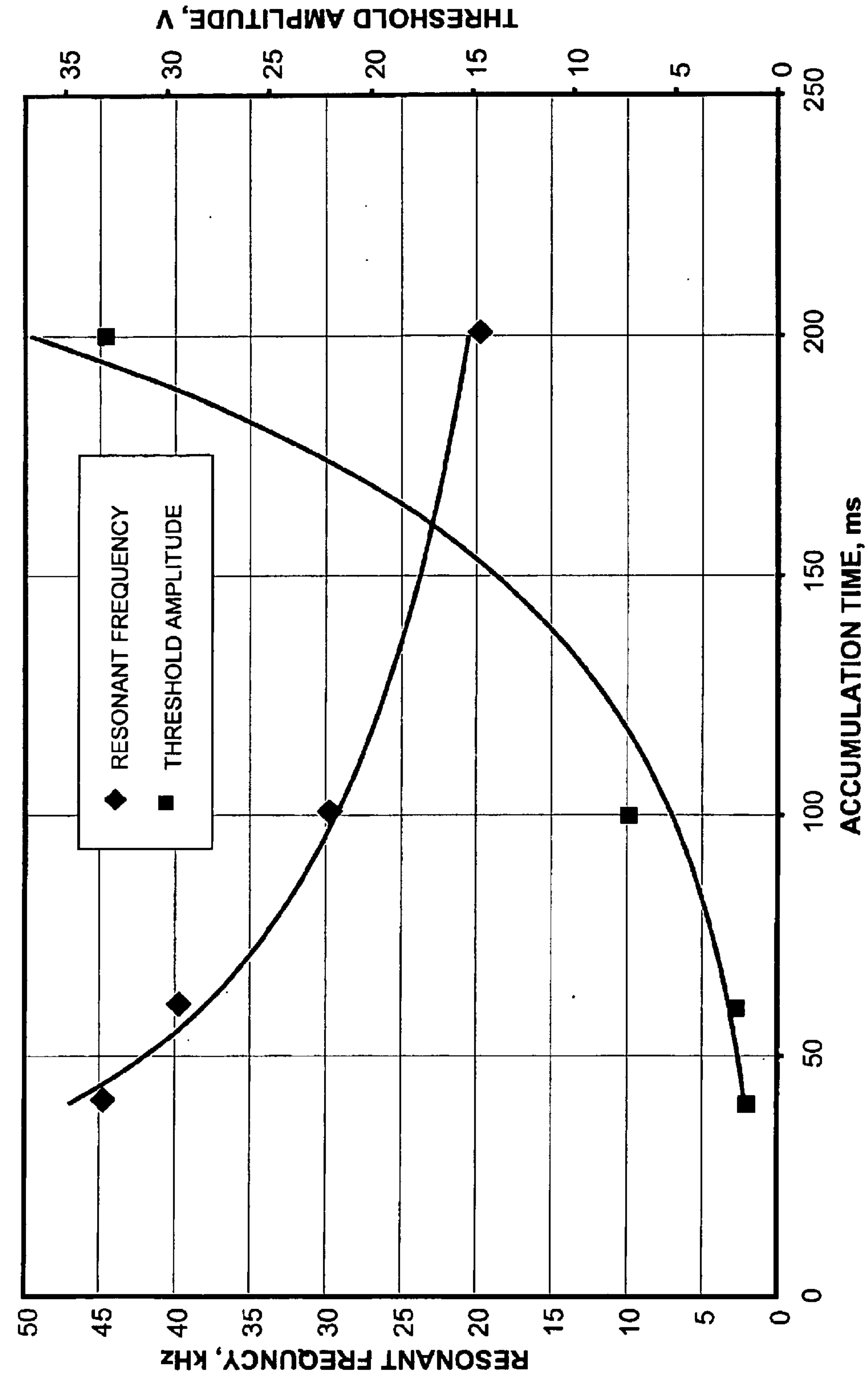
FIG. 6 is a graph showing the dependence of the resonant frequency for dipolar excitation of the singly charged bradykinin ions and the threshold rf-amplitude of the supplementary rf-field in the selection quadrupole on the duration of ion accumulation in the ion guide quadrupole. The Mathieu parameter $q_{[Br+H]^+}=0.25$.

The space charge effects in the selection quadrupoles were further studied in the experiments with a dual external trap. Singly charged bradykinin ions were trapped in the ion guide quadrupole for different accumulation times, transferred to and trapped in the accumulation quadrupole, and then ejected to the FTICR cell. The ions were excited by dipolar irradiation when passing through the selection quadrupole. FIG. 6 shows the dependences of the frequency and threshold amplitude (i.e., the minimum amplitude required to completely eject particular ion species from the selection quadrupole) on the ion accumulation time in the ion guide quadrupole. Notably, the threshold amplitude increases and the resonant frequency for dipolar excitation decreases with an increase in the ion accumulation time.

Several parameters influence the efficiency of selective ion ejection from a linear rf-only quadrupole ion trap when using rf-only dipolar excitation. The motion of ions in the linear rf-only quadrupole is described by the solutions of the Mathieu equation. As described in Dawson, P. H. (Ed.), *Quadrupole Mass Spectrometry and Its Applications*, Elsevier Scientific: New York, 1976, the stability diagram, which represents a graphical illustration of the solution of the Mathieu equation, defines Mathieu's parameter q as follows:

$$q = \frac{4zeV_{rf}}{m\omega_0^2 r_0^2} \tag{1}$$

where $V_{rf}$ is the peak-to-ground rf-amplitude, z is the ion charge state, e is the elementary charge, m is the ion mass, $\omega_0$ is the rf-field angular frequency, and $r_0$ is the quadrupole inscribed radius.

In the first region of ion stability at q<0.4, the ion motion can be presented as a superposition of rapid oscillations and a smooth drift in a harmonic well of the effective potential. As described by Dehmelt, H. G. *Adv. Atom. Mol. Phys.,* 1967, 3, 53–72, in the approximation of a single ion the effective potential for the quadrupole field is governed by:

$$V^*(r) = \frac{z^2 e^2 V_{rf}^2 r^2}{m\omega_0^2 r_0^4} \tag{2}$$

The parabolic distribution of the effective potential implies that, if trapped inside of the linear rf-only quadrupole, a single ion would experience an oscillatory motion in the plane perpendicular to the quadrupole axis with the secular frequency, Ω, governed by:

$$\Omega = \frac{q}{\sqrt{8}}\omega_0 \tag{3}$$

For increasing ion populations, the space charge increasingly perturbs the effective potential distribution by introducing inharmonic terms in Eq. (2). This means that if, in the presence of higher space charge, particular m/z ion species are being excited by an auxiliary resonant rf-field, the excitation becomes off resonant at a particular radius less than the quadrupole inscribed radius. Therefore, the excited m/z ion species are not effectively ejected from the linear quadrupole ion trap, but rather oscillate with increased amplitude and, thereby, also have a higher likelihood of fragmentation in collisions with a background gas.

Another perturbation of ion motion inside of the linear quadrupole ion trap is caused by the fringing rf-fields. If ions are axially trapped between two plates supplied only with dc-potentials, the m/z-dependent axial component of the fringing rf-field results in spatial separation of different m/z species decelerating in the fringing field. In order to minimize fringing field-induced m/z discrimination, the dc-potentials applied to the trapping plates need to be increased. This increase in the trapping dc-potentials is accompanied by an increase in the radial component of the dc-field, causing ion deflection to larger radii, where they can gain additional kinetic energy from the rf-field, again resulting in undesired fragmentation due to collisions with neutral molecules.

Therefore, both space charge in the linear rf-only quadrupole trap and the axial component of the rf-field may decrease the mass resolution of selective ion ejection based on rf-only dipolar excitation. One approach for minimizing space charge and fringing field effects is to conduct selective rf-only ion ejection in the "fly-through" mode using the selection quadrupole. Varying the entry currents to the selection quadrupole over 2 orders of magnitude (10 pA to 1 nA) results in ~20% variation in the resonant dipolar excitation frequency. Further, boundary-effect activated dissociation can be either enhanced or suppressed at shorter accumulation times (i.e., lower space charge in the quadrupole) depending on the axial well depth in the accumulation quadrupole (i.e., a potential difference between the conductance limit and the quadrupole rods). The increase in the fragmentation efficiency with increasing axial potential well depth has been attributed to the increased radial component of the dc-electric field in the turnaround point of ion trajectories, resulting in ion deflection to larger radii where ions gain additional kinetic energy from the rf-field. Varying the axial potential well depth during an LC separation and, therefore, controlling the fragmentation efficiency may be useful for elucidation of detected peptide sequences.

Figure 7:
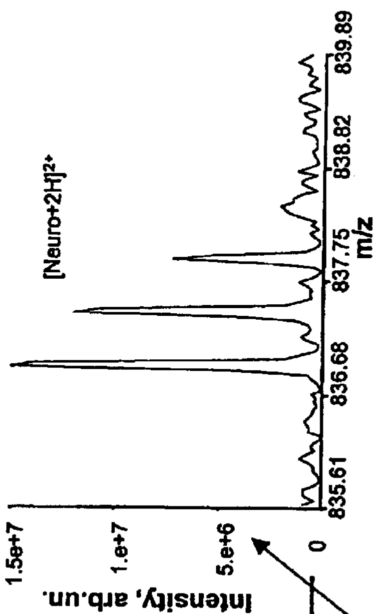
FIG. 7 is the mass spectra obtained from a $10^{-6}$ M mixture of bradykinin (Br), gramicidin S (GrS), fibrinopeptide A (Fibr), angiotensin I (AnI), neurotensin (Neuro), and γ-endorphin (γEnd) using both A) non-selective, and B-C) data-dependent selective external ion accumulation with a two-sequence script described in FIG. 3. A) The non-selective ion accumulation mass spectrum acquired at an axial potential well depth (i.e., a potential difference between the conductance limits and the quadrupole rods) in the accumulation quadrupole of 2 V. The accumulation time was 500 ms followed by a 200-ms long storage period. B) The non-selective ion accumulation mass spectrum acquired in the first sequence at an axial potential well depth in the accumulation quadrupole of 6 V. Accumulation time was 500 ms followed by 200-ms long storage period. Using parallel data acquisition this mass spectrum was converted to the secular frequency spectrum and a 500 $mV_{p-p}$ excitation sine waveform corresponding to the secular frequency of the most abundant ion species was automatically applied to a pair of rods of the selection quadrupole in the second sequence. C) The selective ion accumulation mass spectrum acquired in the second sequence. Accumulation and storage times are the same as in FIGS. 7A–B. The most abundant species of the doubly charged γ-endorphin were ejected on the fly through the selection quadrupole. The Table shows the mass measurement accuracies for the mass spectrum in FIG. 7B.
Figure 7:
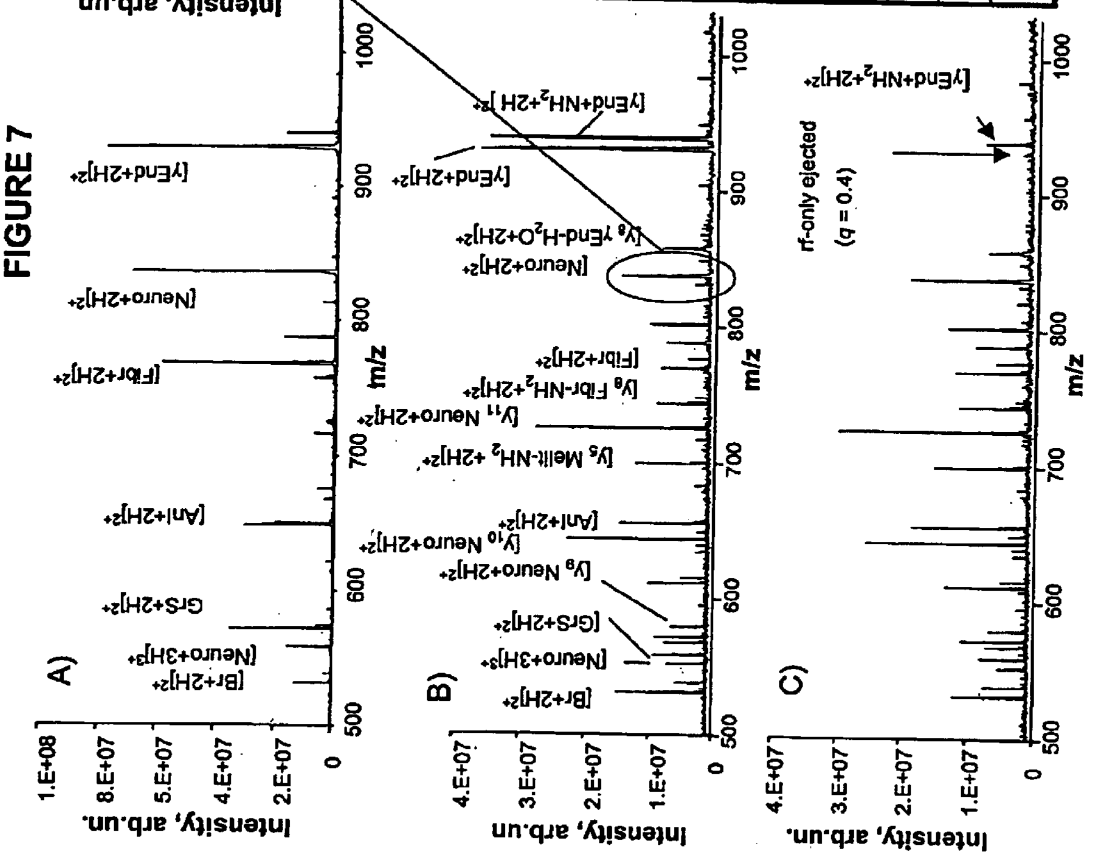

FIG. 7A shows a mass spectrum of a $10^{-6}$ M solution of bradykinin, gramicidin S, fibrinopeptide A, angiotensin I, neurotensin, and γ-endorphin obtained with the non-selective external ion accumulation at an axial potential well of 2 V. FIGS. 7B–C shows the data-dependent external ion accumulation mass spectra of the same peptide mixture acquired at an axial potential well depth of 6 V using a two-sequence script described in FIG. 3. The mass spectrum in FIG. 7B was acquired during the non-selective ion accumulation using in the first sequence. Compared to FIG. 7A, this mass spectrum reveals a significant degree of ion fragmentation in the accumulation quadrupole. The measured and calculated m/z of the parent and several fragment ions, as well as the mass measurement accuracy are summarized in the attached Table. Using parallel data acquisition the mass spectrum was rapidly converted to the corresponding secular frequency spectrum (i.e., the frequency spectrum of ion oscillations in the selection quadrupole) and the most abundant ion species (i.e., the doubly charged ions of γ-endorphin) were automatically ejected during the fly through the selection quadrupole using the second sequence (FIG. 7C). The decrease in the intensity of $[\gamma End+NH_2+2H]^{2+}$ ion species is due to the mass resolution of ~30, obtained in this example. This is insufficient to selectively eject $[\gamma End+2H]^{2+}$ peak at m/z 929.9652 (−1.85 ppm) without affecting $[\gamma End+NH_2+2H]^{2+}$ at m/z 937.9851 (−3.8 ppm). Importantly, in contrast with the mass spectrum shown in Inset 2 of FIG. 5, no additional fragmentation was observed when selectively ejecting the most abundant species from the selection quadrupole. It should be noted that in the fly-through mode the ion's residence time in the selection quadrupole is about 100–200 μs, which is insufficient to cause detectable collisionally activated dissociation at a pressure of $10^{-4}$ torr. The ion species subject to resonant ejection in the fly-though mode need to be excited to radii larger than the exit aperture radius so as to impact the conductance limit and be lost. In contrast, the trapped ion species should be radially ejected from the selection quadrupole. Otherwise, after being excited to larger radii, they would gain additional kinetic energy from the primary rf-field and potentially dissociate in collisions with the background gas. As mentioned earlier, the trapping of excessive space charge in the selection quadrupole distorts the effective potential distribution and results in off-resonance excitation to some radius less than the quadrupole inscribed radius. Therefore, an excitation frequency sweep for efficient ejection of the trapped ion species could potentially reduce their fragmentation.

Figure 8:
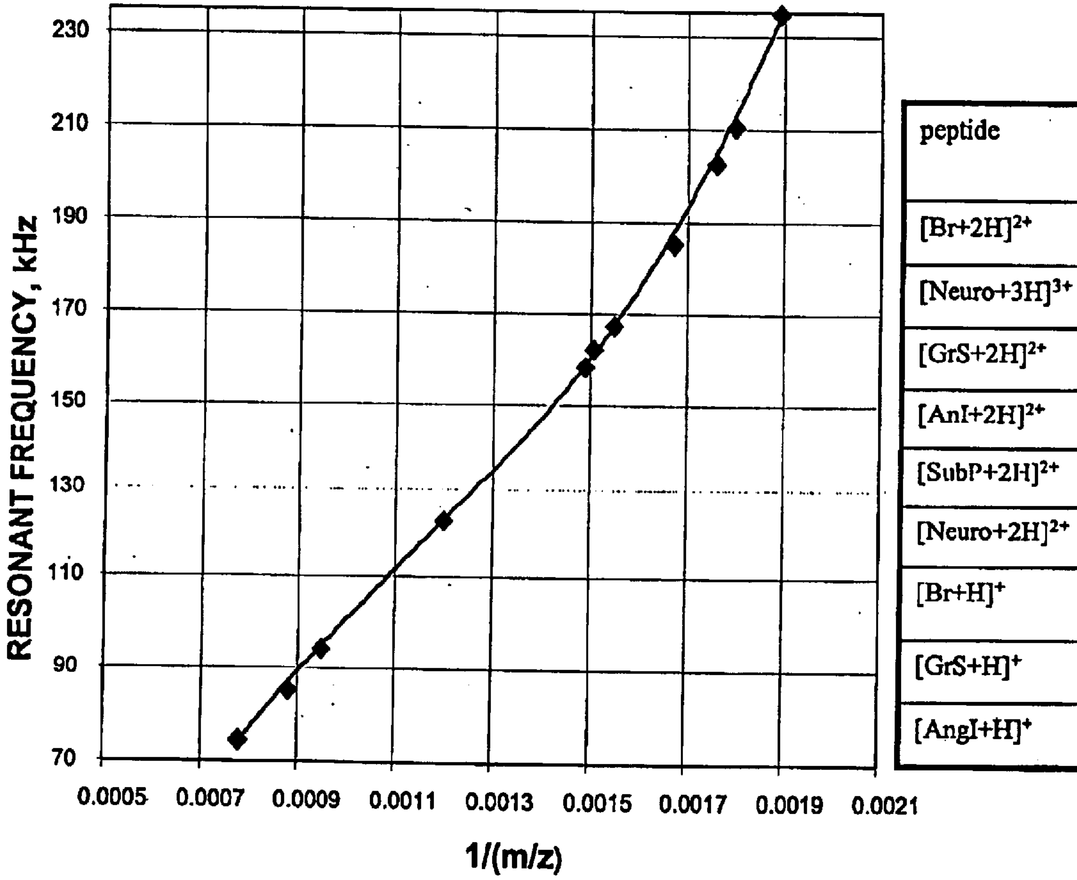
FIG. 8 is a graph showing the dependence of the resonant frequency for ion ejection from the selection quadrupole on the ion's reciprocal m/z obtained using a $10^{-6}$ mixture of bradykinin (Br), gramicidin S (GrS), fibrinopeptide A (Fibr), angiotensin I (AnI), substance P (SubP), and neurotensin (Neuro). The solid line represents a calibration function derived as the least-squares-fit of the experimental data. The Table shows the experimental and predicted resonant frequencies as well as the maximum achievable mass resolution (i.e., the theoretical limit) for rf-only ion ejection from the selection quadrupole during the data-dependent selective ion ejection in the course of LC separation.

FIG. 8 shows the calibration function used for data-dependent selective ejection of the most abundant ion species during an LC/MS run to convert the acquired m/z spectra to secular frequency spectra of ion oscillations in the selection quadrupole. The calibration function was obtained by selectively ejecting ion species from a $10^{-6}$ M solution of bradykinin, gramicidin S, fibrinopeptide A, angiotensin I, substance P, and neurotensin "on the fly" through the selection quadrupole. The data points in FIG. 8 represent the to experimental resonant frequencies (i.e., the frequencies corresponding to complete ejection of the rf-only excited ion species) as functions of the reciprocal m/z, while the solid line shows the calibration function derived from the experimental data by least-squares fitting. The calibration function determines the predicted resonant frequency for rf-only ion ejection from the selection quadrupole and is governed by:

$$f_{predict}[\mathrm{Hz}]=A(z/m)^3+B(z/m)^2+C(z/m)+D \tag{4}$$

$$A=7.009470\times10^{13};\ B=2.299154\times10^{11};\ C=3.614403\times10^{8};\ D=100777.2 \tag{5}$$

Compared to the dependence of the resonant secular frequency on the ion's m/z in the single ion approximation (negligible space charge, see Eq. (3)), the function governed by Eqs. (4–5) corrects for space-charge effects incorporating both the non-linear and zero-order terms in the calibration equation. FIG. 8 gives the experimental and predicted resonant frequencies for ion ejection as well as the maximum achievable resolution due to the deviation of the predicted resonant frequency from the experimental. The maximum resolution for data-dependent resonant ion ejection indicates the theoretical limit when applying a superposition of auxiliary excitation sine waveforms at the frequencies governed by Eqs. (4–5); i.e., since resonant frequencies for ion ejection in the course of LC separation will be chosen by the PC (FIG. 3) based on Eqs. (4–5), the deviation of these frequencies from the experimental (FIG. 8) can limit the effective mass resolution for data-dependent ion ejection from the selection quadrupole.

Figure 9:
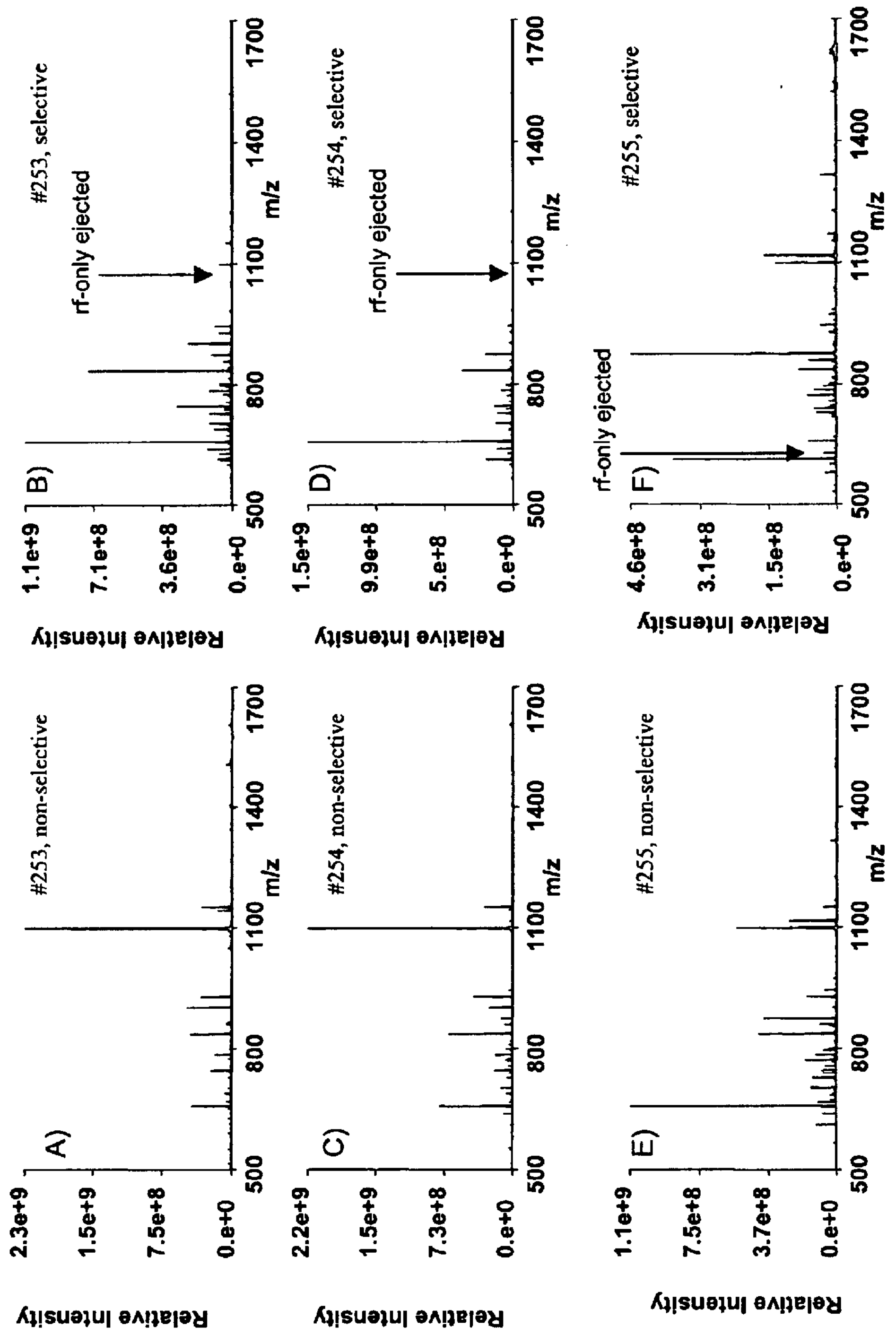
FIG. 9 is a typical mass spectra obtained from a 1 mg/mL soluble yeast proteome extract acquired using the data-dependent selective external ion accumulation. A) non-selective ion accumulation, scan #253, B) selective ion accumulation, scan #253, C) non-selective ion accumulation, scan #254, D) selective ion accumulation, scan #254, E) non-selective ion accumulation, scan #255, F) selective ion accumulation, scan #255. The most abundant ion peak from the previous non-selective accumulation (e.g., m/z 1098.75 in FIGS. 9A and 9C) was resonantly ejected on the fly through selection quadrupole using data-dependent rf-only dipolar excitation to yield the scans immediately following each non-selective accumulation scan.

Having evaluated the data-dependent selective external ion ejection with a mixture of peptides, this approach was then applied to the characterization of a global yeast proteome tryptic digest. LC/FTICR MS data sets from analysis of a 1 mg/mL yeast soluble proteome digest were obtained using the present invention and data-dependent selective external ion ejection. As shown in FIG. 3, two alternating sequences were employed. The non-selective accumulation mass spectra were obtained using a 0.5 s trapping in the accumulation quadrupole, while the data-dependent selective ejection of the most abundant ion species in the fly-through mode in the selection quadrupole was followed by a longer 1 s external accumulation period. FIGS. 9A–F shows typical mass spectra acquired with these two alternating sequences. Both the non-selective and selective ion accumulation were performed at an axial potential well depth of 2 V in the accumulation quadrupole, characterized by the minimum degree of ion fragmentation (FIG. 7A). The most abundant species detected in a non-selective accumulation script (see FIG. 9A) were selectively to ejected on the fly in the selection quadrupole prior to trapping the lower abundance species in the accumulation quadrupole (FIG. 9B). Removing the most abundant ion species in the selection quadrupole thus allowed accumulation of lower abundance species (not evident in the mass spectrum in FIG. 9A). Following the selective ejection of the most abundant species, a non-selective accumulation mass spectrum was again acquired (see FIG. 9C) primarily showing the same species as in FIG. 9A. This indicates that in this case the peptide with a monoisotopic mass of 1098.75 continued eluting from the LC column and was still the primary contributor to space charge effects in the accumulation quadrupole. Examination of the mass spectra acquired using the present invention with automated data-dependent selective external ion accumulation showed that the experimental mass resolution during actual LC separation for rf-only ion ejection from the selection quadrupole was in the range of 30 to 50, depending on m/z.

In the initial demonstration of the present invention two 256K data sets comprising the detected isotopic distributions from the non-selective and selective accumulation runs were obtained. In order to evaluate the approach, these data sets were processed and compared with a data set acquired in a separate LC run using the non-selective external ion accumulation. It was established in the experiments with standard mixture of a $10^{-6}$ M solution of bradykinin, gramicidin S, fibrinopeptide A, angiotensin I, neurotensin, and γ-endorphin that increasing the FTICR signal intensity (i.e., ion population in the FTICR cell) by about two orders of magnitude decreased the detected cyclotron frequency as much as 50 ppm (due to space charge effect). Throughout the LC runs the intensity of the most abundant ion species was found to vary by approximately two orders of magnitude (consistent with variation in a chromatogram obtained using UV detection). Therefore, the data processing for this demonstration was performed assuming that the detected cyclotron frequency of a particular putative peptide would vary within 50 ppm. Note that when corrected for the global space charge, the mass measurement accuracy for a particular mass spectrum remains within 10 ppm using our 3.5 tesla magnet in this work (and less than 1 ppm when using our 11.5 tesla magnet in other studies). The detected isotopic distributions were then combined into "unique mass classes", in which a set of peaks in a series of sequential spectra that arise from the same species and corresponding to the peak for elution of this single species is defined. Thus, to a good approximation the number of unique mass classes is expected to correspond to the number of peptide species detected. The unique mass classes comprised isotopic distributions within 50 ppm that were eluting continuously. If no isotopic distributions were detected within 50 ppm from the particular putative peptide in the next two scans, all other detected m/z species were assigned to different unique mass classes in the present data analysis (though their cyclotron frequencies could deviate by less than 50 ppm from the cyclotron frequency of the identified putative peptide). For example, if two peaks were detected with a cyclotron frequency difference of less than 50 ppm from two separate LC peaks, these peptides were ascribed to two different unique mass classes. Though these peptides have close cyclotron frequencies (i.e., close m/z), they elute at different times and, therefore, will generally correspond to peptides having different sequences (or modifications). Using software available at the Pacific Northwest National Laboratory, all detected isotopic distributions were converted to sets of such unique mass classes. The two data sets of these unique mass classes acquired using alternating sequences in one LC/FTICR run (i.e., the non-selective and selective external ion trapping) were then compared against each other using a Visual Basic macro developed in Microsoft Access. An overlap based on the mass measurement accuracy and elution time criteria was transposed to a separate data set. The maximum variation in the elution time for putative peptides belonging to the same unique mass class (i.e., the widest LC peaks) was about 25 s, corresponding to 10 scans. The number of entries in this overlap database was subtracted from the sum of the entries in the original unique mass class databases and the result was compared with the number of putative peptides identified in a separate LC run using the non-selective external ion accumulation (where the unique mass class treatment was also applied). It was found that the number of peptides detected with the alternating sequences (30,771 unique mass classes were identified with the overlap subtracted) was greater by about 35% than that acquired using the non-selective ion accumulation (where 22,664 unique mass classes were identified). The same methodology was subsequently applied with data-dependent selective ion ejection of the two and three most abundant ion species. A 40% increase in the number of unique mass classes was achieved when combining the non-selective ion accumulation with data-dependent selective ion ejection of the three most abundant ion species.

It should be noted that lower-resolution ion pre-selection step prior to external ion accumulation in the linear rf-only quadrupole filter gives rise to the appearance of small "notches" in a mass spectrum, centering on the high abundant ion species to be ejected. Lower abundance peptide species dispersed in the mass spectrum within these "notches" would be irrevocably ejected from the linear rf-only quadrupole filter. Therefore, increasing the mass resolution of the present invention in ion pre-selection is important for increasing the number of identified putative peptides in the course of a capillary LC separation and for increasing the overall dynamic range of proteomic measurements. The increase in resolution is closely related to the increase in the ion's residence time and limited by the space charge and fringing rf-field.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for increasing the dynamic range of a mass spectrometer having at least one quadrupole ion filter and one mass analyzer, comprising the steps of:

a. passing a first sample of ions through the quadrupole ion filter and the mass analyzer;

b. measuring the intensities of the mass spectrum of said first sample;

c. identifying undesired ions within said first sample from said measurement for ejection;

d. introducing a subsequent sample of ions into the mass spectrometer;

e. superimposing the appropriate resonant if frequencies to the quadrupole ion filter to eject the undesired ions from the from the sequent sample and passing desired ions to the mass analyzer; and f. detecting the mass spectrum of the desired ions in the mass analyzer.

2. The method of claim 1 comprising the further step of accumulating the desired ions in a ion trap interposed between the quadrupole ion filter and the mass analyzer.

3. The method of claim 2 wherein detecting the mass spectrum of the desired ions is performed in a mass analyzer selected from the group consisting of an ion trap mass spectrometer and a Fourier transform ion cyclotron resonance mass spectrometer.

4. The method of claim 2 wherein the ejection of the undesired ions is accomplished by applying resonant if-only voltages to the quadrupole ion filter from the group consisting of dipolar excitation, quadrupolar excitation, and parametric excitation.

5. The method of claim 1 wherein detecting the mass spectrum of the desired ions is performed in a mass analyzer selected from the group consisting of an ion trap mass spectrometer and a Fourier transform ion cyclotron resonance mass spectrometer.

6. The method of claim 1 wherein the ejection of the undesired ions is accomplished by applying resonant rf-only voltages to the quadrupole ion filter selected from the group consisting of dipolar excitation, quadrupolar excitation, and parametric excitation.

7. The method of claim 1 wherein steps a–f are repeated to detect further undesired ions for ejection.

8. A method for increasing the dynamic range of a mass spectrometer having at least one quadrupole ion filter, an ion trap and a mass analyzer, comprising the steps of:

a. passing a first sample of ions through the quadrupole ion filter and the mass analyzer;

b. measuring the intensities of the mass spectrum of said first sample;

c. identifying undesired ions within said first sample from said measurement for ejection;

d. introducing a subsequent sample of ions into the mass spectrometer;

e. superimposing the appropriate resonant if frequencies to the quadrupole ion filter to eject the undesired ions from the subsequent sample;

f. accumulating desired ions from the subsequent sample in the ion trap, g. transferring the desired ions from the ion trap to the mass analyzer, and h. detecting the mass spectrum of the desired ions in the mass analyzer.

9. The method of claim 8 wherein detecting the mass spectrum of the desired ions is performed in a mass analyzer selected from the group consisting of an ion trap mass spectrometer and a Fourier transform ion cyclotron resonance mass spectrometer.

10. The method of claim 8 wherein the ejection of the undesired ions is accomplished by applying resonant rf-only voltages to the quadrupole ion filter selected from the group consisting of dipolar excitation, quadrupolar excitation, and parametric excitation.

11. The method of claim 8 wherein steps a–h are repeated to detect further undesired ions for ejection.

* * * * *